(12) United States Patent
Mueller et al.

(10) Patent No.: US 10,434,673 B2
(45) Date of Patent: Oct. 8, 2019

(54) TRANSVERSE CUTTING OF MOVING FOOD PRODUCT

(71) Applicant: Hochland SE, Heimenkirch (DE)

(72) Inventors: Ralf Mueller, Lindenberg (DE); Alfred Ihler, Weiler-Simmerberg (DE); Thomas Vogel, Maierhoefen (DE)

(73) Assignee: Hochland SE, Heimenkirch (DE)

( * ) Notice: Subject to any disclaimer, the term of this patent is extended or adjusted under 35 U.S.C. 154(b) by 638 days.

(21) Appl. No.: 14/982,845

(22) Filed: Dec. 29, 2015

(65) Prior Publication Data

US 2016/0185002 A1 Jun. 30, 2016

(30) Foreign Application Priority Data

Dec. 30, 2014 (DE) .......................... 10 2014 119707

(51) Int. Cl.
| | | |
|---|---|---|
| *A01J 27/04* | (2006.01) | |
| *B26D 1/09* | (2006.01) | |
| *B26D 1/58* | (2006.01) | |
| *A23C 19/09* | (2006.01) | |
| *B26D 7/32* | (2006.01) | |
| *B26D 3/08* | (2006.01) | |
| *B26D 7/06* | (2006.01) | |
| *B26F 1/18* | (2006.01) | |

(52) U.S. Cl.
CPC .............. *B26D 1/09* (2013.01); *A01J 27/04* (2013.01); *A23C 19/0908* (2013.01); *B26D 1/58* (2013.01); *B26D 3/085* (2013.01); *B26D 7/0625* (2013.01); *B26D 7/32* (2013.01); *B26F 1/18* (2013.01)

(58) Field of Classification Search
CPC . B26D 1/09; B26D 1/58; B26D 3/085; B26D 7/0625; B26D 7/32; A01J 27/04; A23C 19/0908; B26F 1/18

USPC ................... 426/76, 518, 580, 582
See application file for complete search history.

(56) References Cited

U.S. PATENT DOCUMENTS

| 6,237,456 B1 | 5/2001 | Baur | |
| D537,606 S * | 3/2007 | Cumpton | .................. D1/121 |
| 2006/0042434 A1 | 3/2006 | Cumpton et al. | |
| 2011/0226102 A1 | 9/2011 | Biggel et al. | |
| 2017/0057111 A1 | 3/2017 | Schellheimer et al. | |

FOREIGN PATENT DOCUMENTS

| JP | H04360790 A | 12/1992 |
| JP | H1014428 A | 1/1998 |
| JP | 2014161975 A | 9/2014 |

* cited by examiner

*Primary Examiner* — Leslie A Wong
(74) *Attorney, Agent, or Firm* — Robert Lelkes (57) ABSTRACT

A cutting device, knife carrier suitable for use in the cutting device, a cutting system and method for cutting a strand of stacked bands of a food product are disclosed. The cutting device, knife carrier, cutting system and method combine a transverse cutting knife with a diagonal cutting knife disposed at an oblique angle with respect to the transverse cutting knife. The diagonal cutting knife diagonally cuts the stack simultaneously with transverse cutting of the stack by the transverse cutting knife to form substantially triangular prism shaped stacks made of corresponding substantially triangular shaped slices. A food product obtainable by the method is disclosed, wherein (a) the food product comprises at least two stacks of food product, wherein the edges of individual slices forming the hypotenuse of one substantially triangular prism shaped stack are disposed adjacent to the edges of the individual slices forming the hypotenuse of the other substantially triangular prism shaped stack in one-to-one relation to one another and/or (b) the substantially triangular footprint of each stack is in the form of a quadrilateral, wherein at least 80 percent of the surface area of the quadrilateral is triangular.

19 Claims, 5 Drawing Sheets

TRANSVERSE CUTTING OF MOVING FOOD PRODUCT

BACKGROUND OF THE INVENTION

Field of the Invention

The invention relates to a method and a device for transversely cutting a strand of adhesively stacked bands of a food product, in particular a band of stacked strips of a pasty food product, such as, for example, industrially produced cheese, which strand is moved with a conveyance speed in a conveyance direction. This strand is cut with a transverse cutting knife which spans the entire width and, during the transverse cutting, carries out a cutting motion which is appropriate for the conveyance speed and the height of the strand and is therefore carried out with a conveyance speed parallel to the conveyance direction and with a cutting speed perpendicular to the conveyance direction. With this cutting motion, a stack of stacked slices of the food product is separated from the head of the strand. The invention also relates to the food product produced according to the method.

Description of Related Art

Such transverse cutting devices are known, in particular, from the production of processed cheese slices which lie on top of one another and are packaged in stacks, so-called "slice on slice" stacks, of the type, for example, which are delivered to fast food restaurants. In order to produce such stacks, first a wide cheese band is generated, which is subsequently longitudinally cut into individual strips. In order to facilitate the subsequent removal, the strips are placed over one another with a slight offset and are then fed to the transverse cutting device, which cuts the continuously fed, stacked processed cheese bands into individual stacks having a preset length. In the stacks, the individual slices have a rectangular, in particular an at least approximately square format. The stacks are subsequently transported to the next station with the aid of the conveyor belt. An example of such a cutting device is disclosed in U.S. Pat. No. 6,237,456.

It is also known that pre-cut cheese slices in other formats are required, in particular for the mass production of fully assembled sandwiches. In this connection, a triangular format for sandwiches has recently become popular because, in this format, the ingredients are particularly clearly visible to the customer. The cutting of corresponding triangular slices is known, for example, from US Patent Publication 2006/0042434 A1, wherein the resultant stack of triangular slices is evident in U.S. Pat. No. 537,606.

In this method, a relatively tall stack of a multiplicity of individual slices is guided, in a horizontal position, through a blade device, which cuts all the way through the stack. Depending on the consistency of the cheese, such a cut, due to the strong compression forces, effectuates a more or less strong deformation of the stack which, in the cut state, can be mechanically handled only under certain conditions. In addition, in the case of cuts carried out in this manner using a wire or a blade, the cut edges of the cheese slices fray, which adversely affects the attractiveness of the product.

The problem addressed by the invention is therefore that of providing a method, which can be implemented using simple means, for carrying out a transverse cut and a diagonal cut through a stack of slices of a food product lying on top of one another, which method carries out the cuts with high precision and with high quality. In addition, the problem is that of providing a corresponding device.

These problems are solved by the present invention.

SUMMARY OF THE INVENTION

One aspect of the present invention is a cutting device for cutting a strand of stacked bands of a food product comprising:
 a knife carrier adapted for mounting two cutting knives at an oblique angle to each other,
 a transverse cutting knife mounted on the knife carrier,
 a diagonal cutting knife mounted on the knife carrier at an oblique angle relative to the transverse cutting knife for cutting a food product at the oblique angle relative to the transverse cutting knife.

Another aspect of the present invention is a cutting system for transversely cutting a strand (3) of stacked bands (4) of a food product, such as industrially produced cheese, comprising:
 a knife carrier (1) on which a transverse cutting knife is mounted and
 a drive device (15) adapted for attaching the knife carrier, wherein the drive device is suitable for driving the knife carrier (1) equipped with the transverse cutting knife in a reciprocal cutting motion,
wherein a diagonal cutting knife is disposed at an angle with respect to the transverse cutting knife, which is mounted together with the transverse cutting knife on the knife carrier (1).

A further aspect of the present invention is a knife carrier for mounting cutting knives for cutting a strand of stacked bands of a food product comprising:
 a mounting platform (12) and
 a first, a second and a third cutting knife holder (6a, 6b, 6c), each cutting knife holder having a first end and a second end, wherein the first end of each cutting knife holder is fixedly connected to the mounting platform (12) and the second end of each cutting knife holder is adapted for attaching at least one cutting knife, wherein the second ends of the cutting knife holders are in spaced apart relation to each other in substantially the same plane in spaced apart relation to the mounting platform (12).

Another aspect of the present invention is a method for transversely cutting a strand (3) of adhesively stacked bands (4) of a food product, such as industrially produced cheese, which strand is moved with a conveyance speed in conveyance direction (A), which cutting is carried out by means of a transverse cutting knife which spans the width of the strand (3) and carries out a cutting motion for the transverse cutting, wherein the cutting motion is preferably guided with a conveyance speed parallel to the conveyance direction (A) and with a cutting speed perpendicular to the conveyance direction and wherein, with the cutting motion, a stack (5) formed of slices (14) of the food product is separated from the strand (3), wherein a diagonal cutting knife is provided, which spans the width of the strand (3) and is disposed at an angle with respect to the transverse cutting knife, which diagonal cutting knife simultaneously carries out the cutting motion together with the transverse cutting knife and thereby diagonally cuts the stack (5), wherein the stack is cut, with the diagonal cut, into two sub-stacks (10) formed of triangular slices.

Yet another aspect of the present invention is a food product comprising at least one stack of food product in the form of individual slices, wherein each stack is in the form of a substantially triangular prism having two sides at substantially right angles to each other, wherein each individual slice in the stack is substantially triangular, has two edges perpendicular to each other and one edge which forms the hypotenuse of the right triangle, wherein (a) the food product comprises at least two stacks of food product, wherein the edges of individual slices forming the hypotenuse of one stack are disposed adjacent to the edges of the individual slices forming the hypotenuse of the other stack in one-to-one relation to one another and/or (b) the substantially triangular footprint of each stack is in the form of a quadrilateral, wherein at least 80 percent of the surface area of the quadrilateral is triangular.

BRIEF DESCRIPTION OF THE DRAWINGS

The invention is exemplified by the illustrative embodiments shown the figures as follows.

DETAILED DESCRIPTION OF THE INVENTION

Definitions

As used herein, the expressions "triangular prism" and "triangular prism shaped" refer to a shape corresponding substantially with a polyhedron made of a triangular base, a translated copy, and 3 faces joining corresponding sides, wherein the three faces are parallelograms. This expression encompasses non-truncated and truncated triangular prisms.

The substantially triangular slices in the triangular prism shaped stacks may have one or two edges cut from the longitudinal side of the stacked band of food product that are offset from each other, such as when the stacks are cut from a band of food product slices stacked in a laterally offset manner relative to each other, and/or the tip of one or more ends of the triangular slices may be flattened as further described below. The translated copy of the triangular base and the individual substantially triangular slices between the ends of the triangular prism may therefore have a shape deviating slightly, such as up to 10 percent, preferably up to 5 percent, and preferably at least 1 percent, of its surface area, relative to the triangular base.

Preferred Embodiments

In one embodiment of the present invention, the diagonal cutting knife spans the width of the strand and is mounted, together with the transverse cutting knife, on a knife carrier and therefore carries out a cutting motion simultaneously with the transverse cutting knife. In this connection, due to the diagonal orientation of the diagonal cutting knife, the stack of rectangular slices cut off of the strand by means of the transverse cutting knife is cut into two sub-stacks of substantially triangular slices. Each sub-stack is preferably in the form of a substantially triangular prism.

In a preferred embodiment, the "substantially triangular" format is a format in which a tip, and preferably only one tip, of the hypotenuse of each triangle is approximately "flattened", in order to ensure, for example, that the slices can be more easily grasped from the stack. The "flattening" is achieved, for example, in that the diagonal cut is not carried out exactly from one corner of the rectangular stack to the other corner, but rather starts and/or ends with a slight offset on the longitudinal edge of the stack. This offset is preferably obtained by mounting the diagonal cutting knife at an angle offset in either direction from one in which the stack cut by the transverse cutting knife is cut from the tip of the corner formed by a transverse cut by the transverse cutting knife. In a preferred embodiment, the flattened tip is a portion of the longitudinal side of the band of stacked food product from which the substantially triangular prism shaped stacks are cut. A length of a few millimeters for the flattened edges, such as a length in the range from 1 to 5 mm, is sufficient for facilitating grasping an individual slice of the food product.

In a preferred embodiment, the substantially triangular footprint of each slice, and therefore of each stack, is in the form of a quadrilateral, wherein at least 80 percent, and preferably up to 99 percent, more preferably up to 96 percent, of the surface area of the quadrilateral is triangular, wherein the triangular shape is preferably in the form of a right triangle and the quadrilateral preferably has a right angle corresponding to the right angle of the right triangle.

In addition, "substantially triangular" does not necessarily mean that the edges of the triangle must be straight. For example, specifically when knives are used which have a fixed blade instead of a wire, it is also possible to produce edges having any type of shape, such as a triangle having curved sides. The transverse cutting knife and the diagonal cutting knife are each therefore preferably cutting blades. The cutting blades are preferably rigid and are preferably made of a corrosion resistant metal, such as stainless steel.

As described, the flattened tip simplifies the handling of the individual slice. In this connection, it is also advantageous when the individual strips each lie on top of one another with a slight offset and not in alignment. The offset between the individual slices is likewise in the order of magnitude of a few millimeters, wherein the offset is present only on the side edges, but the slices lie on top of one another in alignment at the cut edges. Gripping edges therefore remain accessible in the stacks, which further facilitates manual peeling-off of each individual slice from the stack and therefore makes the use of the product more convenient.

When the strips or bands in the stack are offset, the substantially triangular prism shaped stacks may be truncated substantially triangular prism shaped stacks and the non-triangular faces may be non-rectangular parallelograms and/or the substantially triangular slices in the prism shaped stacks may have one or two edges cut from the longitudinal side of the stacked band of food product that are offset from each other.

According to the present invention, the method is distinguished in that the diagonal cutting knife, which spans the width of the strand and is disposed at an angle relative to the transverse cutting knife, simultaneously carries out the cutting motion and thereby diagonally cuts the stack. The diagonal cut cuts the strand into a pair of substantially triangular prism shaped stacks formed of substantially triangular slices, wherein the diagonal cut does not necessarily need to cut all the way through the bottom slice in the stack, i.e., the last slice to be cut.

Finally, it is advantageous for further handling of the cut-off stack when the diagonal cutting knife cuts completely through all the slices in the stack except for the bottom slice, and only cuts into or perforates the bottom slice. According to this aspect of the present invention, the pair of separated substantially triangular prism shaped stacks stand on a common slice, which has only been cut into but holds the two stacks together, particularly when the food product has adhesive properties, such as when the food product is cheese. The pair of stacks can be conveyed relatively securely on the conveyor belt on this bottom slice, which has not been cut all the way through, without the stack tipping over. The product can also be packaged for the consumer with the common slice base. The consumer can first lift all the triangular slices off of the stack until he reaches the bottom slice, which he can then very easily tear apart at the "predetermined breaking line" made by the diagonal cutting knife.

This effect may be achieved with the present invention by mounting the diagonal cutting knife so that its cutting edge is offset upward relative to the cutting edge of the transverse cutting knife and/or by using a diagonal cutting knife having a curved cutting edge, such as a diagonal cutting knife having a cutting edge curved at both ends, or having a wavy or serrated profile, relative to the cutting direction, so that the bottom slice is not cut completely through from one longitudinal edge to the other longitudinal edge of the band of stacked food product.

Therefore, one aspect of this invention is a cutting device in which the transverse cutting knife and the diagonal cutting knife each have a cutting edge, wherein the cutting edge of the transverse cutting knife is located substantially within one plane which is preferably perpendicular to a cutting direction. The cutting edge of the diagonal cutting knife may be straight, curved or serrated and located in, or offset and substantially parallel to, the plane passing through the cutting edge of the transverse cutting knife.

Alternatively, the diagonal cutting knife may have a straight cutting edge which may or may not be offset relative to the cutting edge of the transverse cutting edge. In some cases, it may be advantageous to obtain a clean cut to the bottom of the stack with both the transverse cutting knife and the diagonal cutting knife by using cutting knives having straight edges which are preferably not offset from each other.

The cohesion between the individual slices in each substantially triangular prism shaped stack is preferably sufficient to allow the stack to be tilted and/or grasped in a downstream stacking device and placed on top of another stack using a stacking device. The cohesion is preferably due to adhesiveness of the individual slices when the individual slices are in contact with each other. The adhesiveness may be obtained by selecting food products having an inherently adhesive surface. Towers comprising multiple stacks can then be packaged and made available to the consumer in larger containers. Several-kilogram portions of the type required for fast food chains, in particular, can therefore be produced.

An aspect of the present invention is a food product comprising two stacks of food product in the form of individual slices, wherein each stack is in the form of a substantially triangular prism having two sides at substantially right angles to each other, wherein each individual slice in the stack is substantially triangular, has two edges perpendicular to each other and one edge which forms the hypotenuse of the right triangle, wherein the edges of individual slices forming the hypotenuse of one stack are disposed adjacent to the edges of the individual slices forming the hypotenuse of the other stack in one-to-one relation to one another.

Another aspect of the invention is a stack of food product in the form of individual slices, wherein the stack is in the form of a substantially triangular prism having two sides substantially perpendicular to each other, wherein each individual slice in the stack is substantially triangular, has two edges perpendicular to each other corresponding to the two sides of the substantially triangular prism substantially perpendicular to each other and one edge which forms the hypotenuse of the right triangle, wherein the substantially triangular footprint of each stack, and therefore of each slice in the stack, is in the form of a quadrilateral having a right angle corresponding to the two sides of the substantially triangular prism substantially perpendicular to each other, wherein at least 80 percent, and preferably up to 99, more preferably up to 96, percent, of the surface area of the quadrilateral is triangular.

In a preferred embodiment, each substantially triangular prism shaped stack contains at least 10, more preferably at least 20, and even more preferably at least 30, and preferably up to 120, more preferably up to 80, individual slices and the individual slices preferably have a thickness of at least 1 mm and preferably up to 8 mm, more preferably up to 5 mm, and even more preferably up to 3 mm. The footprint of each substantially triangular prism and each of the corresponding substantially triangular individual slices of the substantially triangular prism preferably have a surface area of at least 25 $cm^2$, more preferably at least 40 $cm^2$, and preferably up to 160 $cm^2$, more preferably up to 100 $cm^2$. Each side of the footprint of the substantially triangular prism and each of the corresponding substantially triangular slices opposite the hypotenuse preferably has a length of at least 7 cm, more preferably at least 9 cm, and preferably up to 18 cm, more preferably up to 14 cm.

The food product is preferably a soft, pasty and/or flexible solid mass, which preferably has a substantially homogeneous firmness. In a preferred embodiment, the food product is a cheese or cheese substitute, which is preferably an industrially produced cheese or cheese substitute, such as processed cheese.

In contrast to the diagonal cut, the transverse cut carried out by the transverse cutting knife preferably completely separates the stack from the head of the strand, which is preferably moving with a conveyance speed in the conveyance direction. In order to support the separation from the strand, the transverse cutting knife, after having cut all the way through the stack, may carry out a slight pushing motion in the conveyance direction, which pushes the stack comprising the pair of adjacent substantially triangular prism shaped stacks described above slightly forward to separate the pair of substantially triangular prism shaped stacks from the head of the strand from which it was cut.

In another embodiment, however, the separation is advantageously carried out such that the strand is fed with a conveyance speed by a first conveyor belt, while the cut-off stack is carried away by a second, adjacent conveyor belt with a removal speed which is at least slightly greater than the conveyance speed. The belt transition and the acceleration to the removal speed are easily achieved when the bottom slice is not cut all the way through according to a preferred embodiment, so that the remaining integrity of the bottom slice holds each pair of adjacent substantially triangular prism shaped stacks together. This approach facilitates further downstream separation and handling of each pair of adjacent substantially triangular prism shaped stacks generated by each cutting cycle using the combination of a transverse cutting knife and a diagonal cutting knife according to the present invention.

The transition between the conveyor belts is advantageously located at the position at which the transverse cutting knife finishes the cut. Therefore, the transverse cutting knife can enter the gap between the two conveyor belts and cut all the way through the stack. When the food product has a pasty consistency, the inventors found that it is not absolutely necessary for the separating cut to be performed against a hard support.

In order to stabilize each pair of substantially triangular prism shaped stacks during the cut, such as when the food product has a pasty consistency which adheres to the knives, it is particularly advantageous to use a hold-down device during withdrawal of the knives from the cut. Such a hold-down device can be mounted on the knife carrier.

In one embodiment, the hold-down device applies a downward force on the cut stack while the knives are lifted by the knife carrier to remove the knives from the cut stack. The application force may, for example, be induced by springs which, after the hold-down device is placed on the stack, become loaded as the cutting progresses. Therefore, a spring-loaded hold-down device may be mounted on the knife carrier of the transverse cutting to prevent the stack from lifting up as the knives are removed from the cut stack.

In a preferred embodiment, the knife carrier comprises a hold down device elastically mounted between the second ends of two of the cutting knife holders, wherein the hold down device has a slot aligned with the two cutting knife holders. The slot is preferably aligned with cutting knife holders intended for holding a diagonal cutting knife, so that the slot can receive a diagonal cutting knife. The slot preferably has a depth sufficient to fully retract a diagonal cutting knife into the slot.

The invention has important advantages. For example, the combination of transverse cutting and diagonal cutting in one tool eliminates the need for an additional device for purely diagonal cutting, which would follow a transverse cutter known so far. The device according to the invention can therefore be easily incorporated into a conventional production line. Available devices for purely transverse cutting can be retrofitted, using simple means, with the diagonal cutting knife which, in the simplest case, is mounted on the common knife carrier.

In addition, it is advantageous when the two knifes disposed at an angle are solid blades and not cutting wire. The rigid blades make it possible to achieve particularly sharp cuts and correspondingly cleaner cut edges on the food product, and therefore the attractiveness in the eye of the consumer increases further. These solid blades also make it possible to cut through separating layers which may be provided between the individual slices. A further advantage of using rigid blades is that these do not necessarily need to be straight, but rather can also be designed to be curved, wavy, or serrated—also in any desired shape, so that slices having a correspondingly shaped edge can be produced. The devices designed in such a way are even suited, in particular, for cutting thick strands or even products having a high cutting resistance for a given thickness. In the case of cheese products, stack heights of up to 15 cm are ideal, wherein up to 200 cuts per minute can be easily carried out with the devices according to the invention.

The knife carrier may be mounted on any drive device capable of raising and lowering the knife carrier relative to a strand of food product for cutting the strand of food product. The drive device is preferably adapted for driving oscillating, more preferably reciprocal, displacement of the cutting device between a raised position and a lowered position. The knife carrier is preferably mounted above a conveying device for conveying a strand of food product.

In one embodiment, the drive device is adapted to raise and lower the knife carrier in a vertical direction and the conveying device is adapted to horizontally convey a strand of food product in coordination with the drive device.

In another embodiment, the drive device is adapted to raise and lower the knife carrier vertically and horizontally (i.e., in at least two dimensions) to allow for continuous conveyance of the strand of food product in one conveyance direction concurrently with carrying out cutting operations on the continuously conveyed strand of food product with the knife carrier. Examples of such drive devices are disclosed in U.S. Pat. No. 6,237,456 and published international patent application WO 2015/128198, which are hereby incorporated herein by reference as if fully set forth herein.

Figure 1:
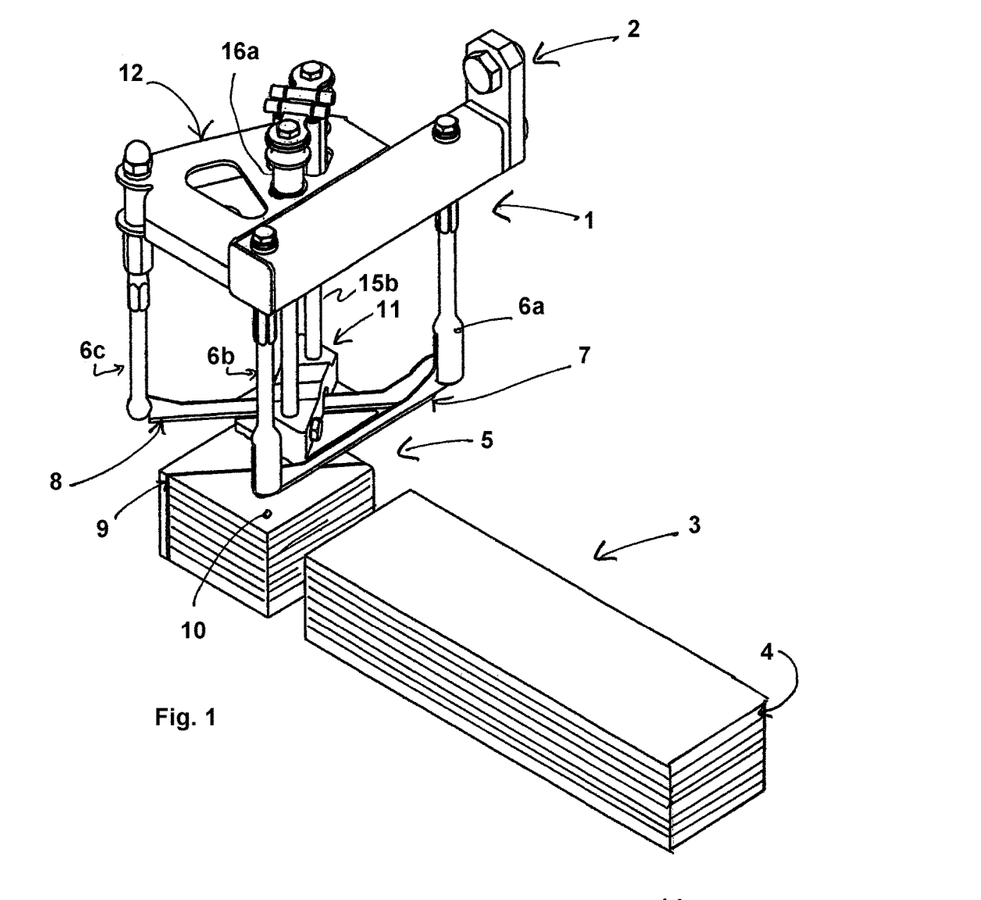
FIG. 1 shows a perspective view of a knife carrier according to the invention having a transverse cutting knife and a diagonal cutting knife with a stack of food bands after a cutting operation.

FIG. 1 shows a knife carrier 1, which is mounted, via a support 2, on the device for transverse and diagonal cutting and is moved as a complete unit by means of a drive device along a predefined motion curve in a cutting motion. In this figure, only one strand 3 of adhesively stacked bands 4 of a food product, which is processed cheese in this case, is shown, from the head of which a stack 5 was cut and separated.

A transverse cutting knife 7 spanning the width of the strand 3 is mounted on the knife carrier 1, which comprises two lateral knife holders 6. The transverse cutting knife preferably has a straight cutting edge.

A diagonal cutting knife 8, which likewise spans the width of the strand 3 and is disposed at an angle, such as an angle in the range from 40° to 50°, such as approximately 45°, with respect to the transverse cutting knife, is mounted on the knife carrier 1 on two further holders in the same manner, which diagonal cutting knife has a corresponding rigid knife 8. The transverse cutting knife 7 and the diagonal cutting knife 8 are fixedly coupled to one another by means of the knife carrier 1, wherein the cutting edge (i.e., the lower edge) of knife 8 of the diagonal cutting knife may be slightly higher than the cutting edge (i.e., lower edge) of knife 7 of the transverse cutting knife so that the diagonal cut is not carried out all the way through the stack 5 to the bottom.

Due to rigid coupling, the diagonal cutting knife 8 therefore carries out the cutting motion simultaneously with the transverse cutting knife 7, wherein the cutting motion of the diagonal cutting knife 8 results in a diagonal cut 9 through the stack 5, so that strand is divided into a pair of substantially triangular prism shaped stacks 10 comprising substantially triangular slices 13. The pair of substantially triangular prism shaped stacks 10 are acted upon from above by a hold-down device 11 during the cutting motion and during the subsequent withdrawal of the diagonal cutting knife 8 out of the cut, wherein the hold-down device 11 rests on the top slice in the stack 5 and remains there under the preload of springs while the diagonal cutting knife 8 performs a cutting operation in the stack 5.

Knife carrier 1 may be used to separate the pairs of substantially triangular prism shaped stacks made by one downward and upward cutting cycle from each other into pairs of substantially triangular prism shaped stacks horizontally spaced apart at the transverse cuts via horizontal displacement of knife carrier 1 relative to the stacked band from which each pair of substantially triangular prism shaped stacks have been cut, so that each pair of substantially triangular prism shaped stacks is displaced away from the stacked band from which each pair of substantially triangular prism shaped stacks has been cut. In this embodiment, the cutting edge of the diagonal cutting knife 8 may be at the same height as, or upwardly displaced relative to, the cutting edge of the transverse cutting knife 7.

In this embodiment, the diagonal cutting knife and the hold-down device 11 are mounted on a mounting platform 12, which is detachably fastened on the knife carrier. After the mounting platform 12, including the diagonal cutting knife and the hold-down device 11, is removed, the device can be operated solely with the transverse cutting knife. On the other hand, a transverse cutting device may be retrofitted for diagonal cutting according to this invention.

It is already evident in FIG. 1 that the stack 5 is not cut exactly diagonally from corner to corner, but rather with a slight offset according to a preferred embodiment of this invention. A pair of substantially triangular prism shaped stacks of substantially triangular slices are therefore produced having at least one flattened tip per stack to facilitate grasping and removal of an individual slice from the stack. The flattened tip is preferably a remnant of the longitudinal edge of the stacked band of food product from which the triangular prism shaped stack was cut.

Figure 2:
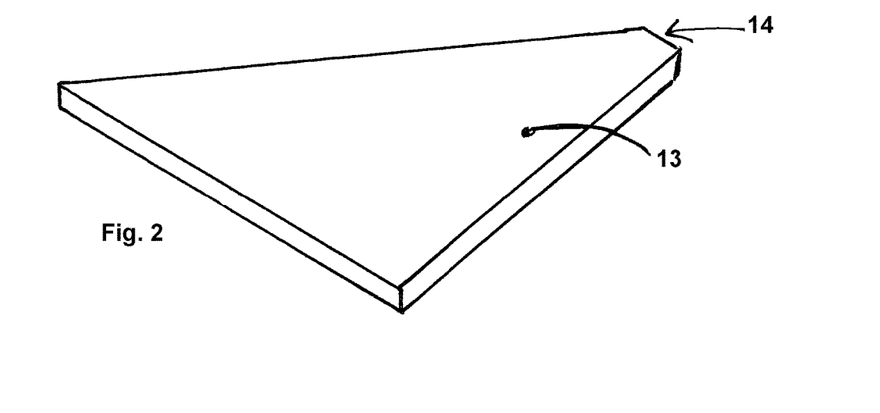
FIG. 2 shows a perspective view of a slice of the product according to the invention.

Such a flattened edge 14 is apparent on the separately depicted substantially triangular individual slice 13 in FIG. 2. The slices of the adjacent second substantially triangular prism shaped stack of the pair of substantially triangular prism shaped stacks have a corresponding format, preferably as a mirror image of the slices in the first stack.

Figure 3:
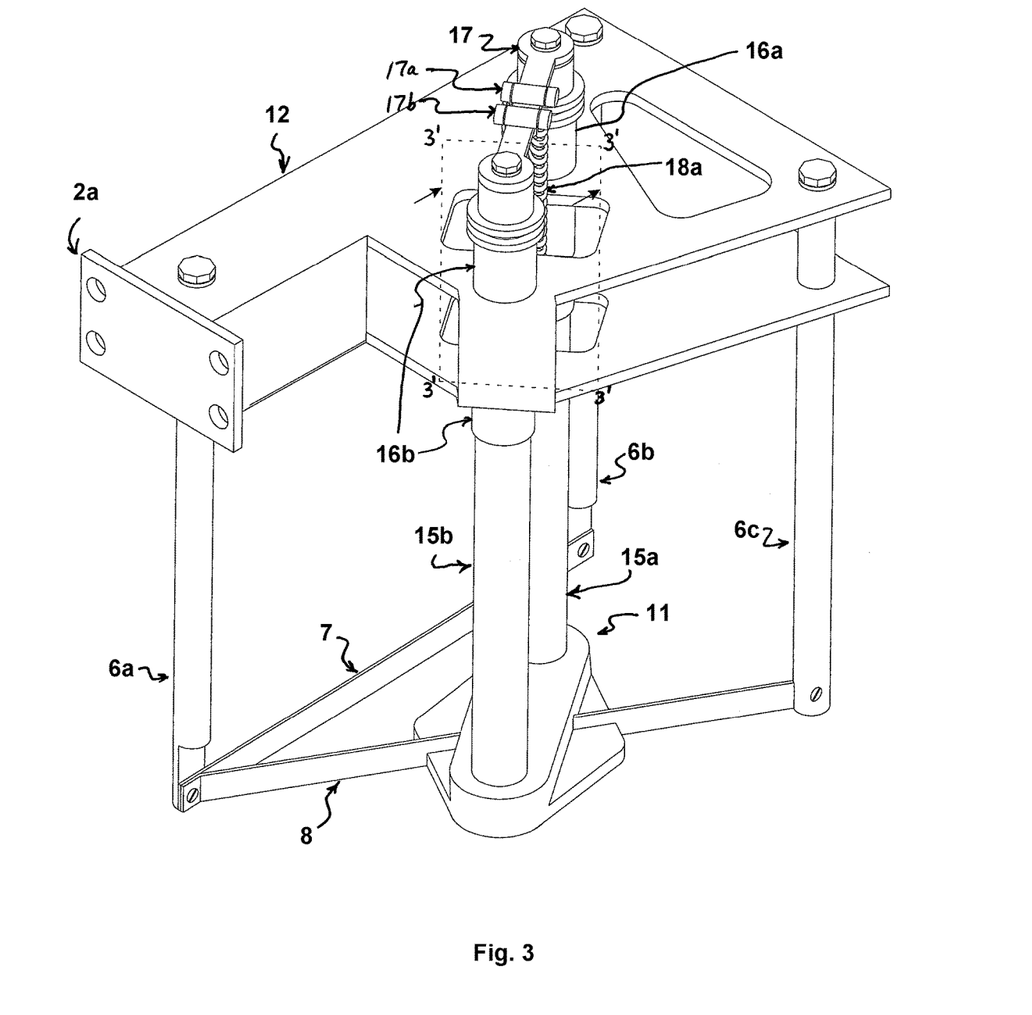
FIG. 3 shows a perspective view from the back side of a knife carrier according to the invention similar to that of FIG. 1 without the stack of food bands and drive when it is in a raised position as shown in FIG. 1.

FIG. 3 shows a perspective view of a knife carrier 1 similar to that shown in FIG. 1 from the backside without the stacked bands of food product, sub-stacks, conveyor and drive device in order to show the components of the knife carrier 1 in greater detail. As can be seen in FIG. 3, transverse cutting knife 7 and diagonal cutting knife 8 are mounted on cutting knife holders 6a, 6b and 6c, which are affixed to mounting platform 12.

Hold-down device 11 is mounted on the lower end of a pair of guide shafts 15a, 15b, preferably in a fixed orientation perpendicular to the pair of guide shafts 15a, 15b. Each guide shaft 15a, 15b is retractably mounted, such as slidably mounted within guide shaft sleeves 16a, 16b, such as cylinders having a low friction inner surface, such that each guide shaft 15a, 15b passes through guide shaft sleeve 16a, 16b, respectively, in a direction that is preferably substantially parallel to one another and preferably substantially vertical.

The upper ends of the pair of guide shafts 15a, 15b are elastically connected to the knife carrier (1). In this embodiment, the upper ends of guide shafts 15a, 15b are attached to guide shaft connecting bridge 17, preferably in a fixed orientation perpendicular to guide shaft connecting bridge 17, to maintain horizontal alignment between the upper ends of the respective guide shafts 15a, 15b.

In this embodiment, guide shaft connecting bridge 17 has a pair of tension spring mounting posts 17a, 17b for mounting one or more tension springs 18, such as tension spring 18a visible in this figure.

Knife carrier 1 may be mounted on a drive device 21, not shown in this figure, via mounting flange 2a to facilitate removal of knife carrier 1 from drive device 21 for repair, maintenance or switching to another knife carrier, such as a knife carrier for making rectangular stacked slices as disclosed, for example, in U.S. Pat. No. 6,237,456 or WO 2015/128198.

Figure 4:
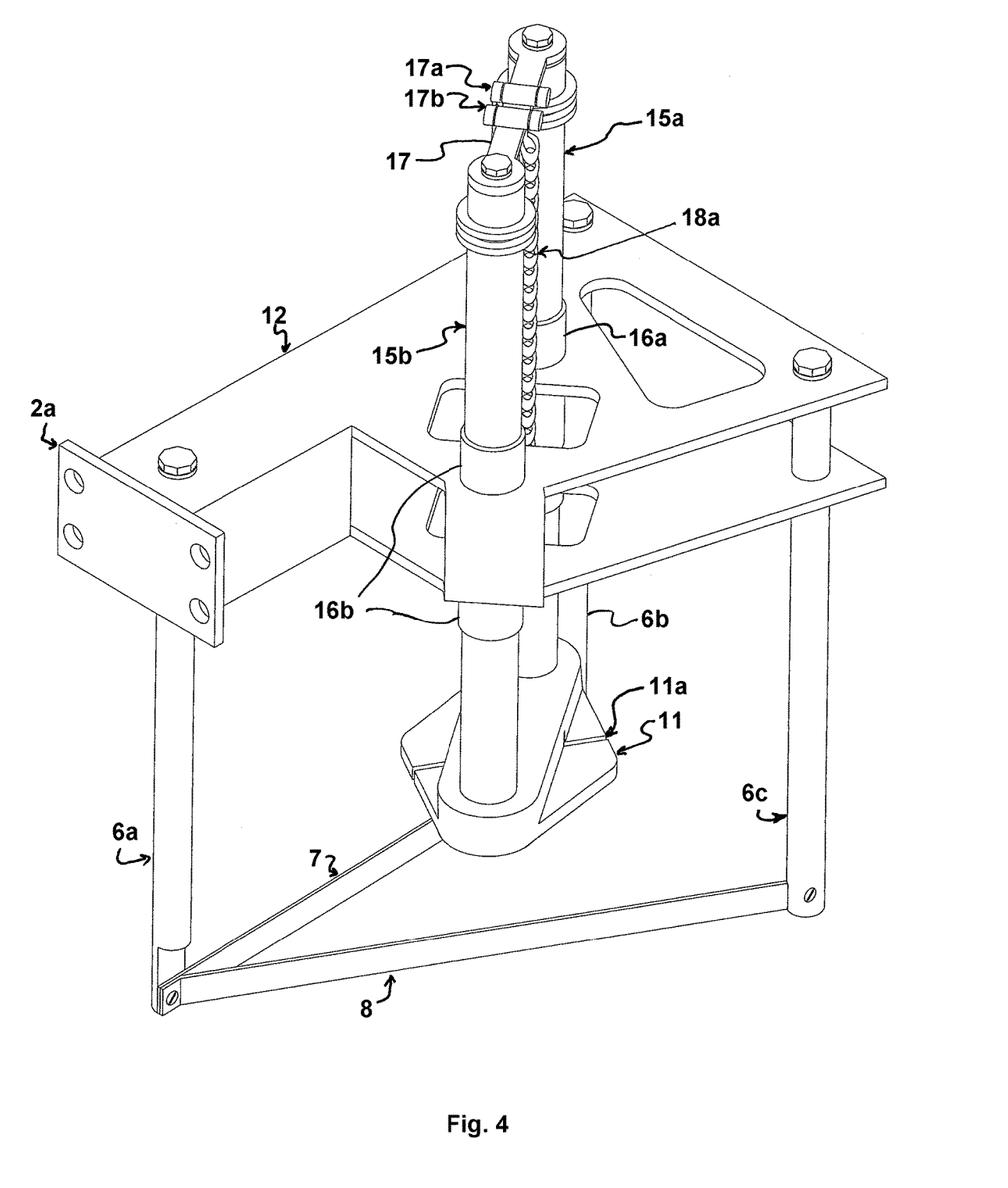
FIG. 4 shows a perspective view of the knife carrier according to the invention shown in FIG. 3 when the knife carrier is in a lowered position.

FIG. 4 shows a perspective view of the knife carrier 1 shown in FIG. 3 when the knife carrier 1 is in a lowered position when carrying out a cutting operation with knife carrier 1. As in FIG. 3, this figure does not show the stacked bands of food product, sub-stacks, conveyor and drive device in order to show the components of the knife carrier 1 in greater detail.

When the knife carrier 1 is lowered into a lowered position when carrying out a cutting operation with knife carrier 1, hold-down device 11 is displaced upward toward mounting platform 12 due to presence of the stacked bands of food product below the hold-down device 11 as the transverse cutting knife 7 and diagonal cutting knife 8 cut through the stacked bands of food to form sub-stacks. The upward displacement force on hold-down device 11 resulting from contact with the stacked bands of food product is transmitted by guide shafts 15a, 15b to guide shaft connecting bridge 17, which in turn applies the upward displacement force to one or more tension springs 18, such as tension spring 18a shown in this figure.

One or more tension springs 18 apply a counter-acting downward force to guide shaft connecting bridge 17, which in turn transmits the counter-acting downward force supplied by one or more tension springs 18 to guide shafts 15a, 15b, which in turn transmit the counter-acting downward force supplied by one or more tensions springs 18 to hold-down device 11. The force applied by one or more tension springs 18 facilitate removal of the transverse cutting knife 7 and especially diagonal cutting knife 8 while raising knife carrier 1 from the lowered position to a raised position to disengage the transverse cutting knife 7 and the diagonal cutting knife 8 from stacked band of food product and the sub-stacks formed by the cutting operation by counter-acting any lifting forces on the respective stacks generated by raising the transverse cutting knife 7 and the diagonal cutting knife 8.

When knife carrier 1 is used to separate the pairs of substantially triangular sub-stacks made by one downward and upward cutting cycle from each other into pairs of substantially triangular sub-stacks horizontally spaced apart at the transverse cuts via horizontal displacement of each pair of sub-stacks away from the stacked band from which each pair of sub-stacks has been cut, the hold-down device also facilitates maintaining the integrity of the sub-stacks during horizontal acceleration and deceleration of the pairs of sub-stacks, which allows for rapid separation of the pairs of sub-stacks.

FIG. 4 also shows slot 11a extending horizontally through hold-down device 11 adapted for receiving diagonal cutting knife 8 when knife carrier 1 resumes the raised position shown in FIG. 3. Slot 11a allows for complete withdrawal of diagonal cutting knife 8 from each pair of sub-stacks previously formed by knife carrier 1 while maintaining downward pressure on the sub-stacks via hold-down device 11 during withdrawal.

Figure 5:
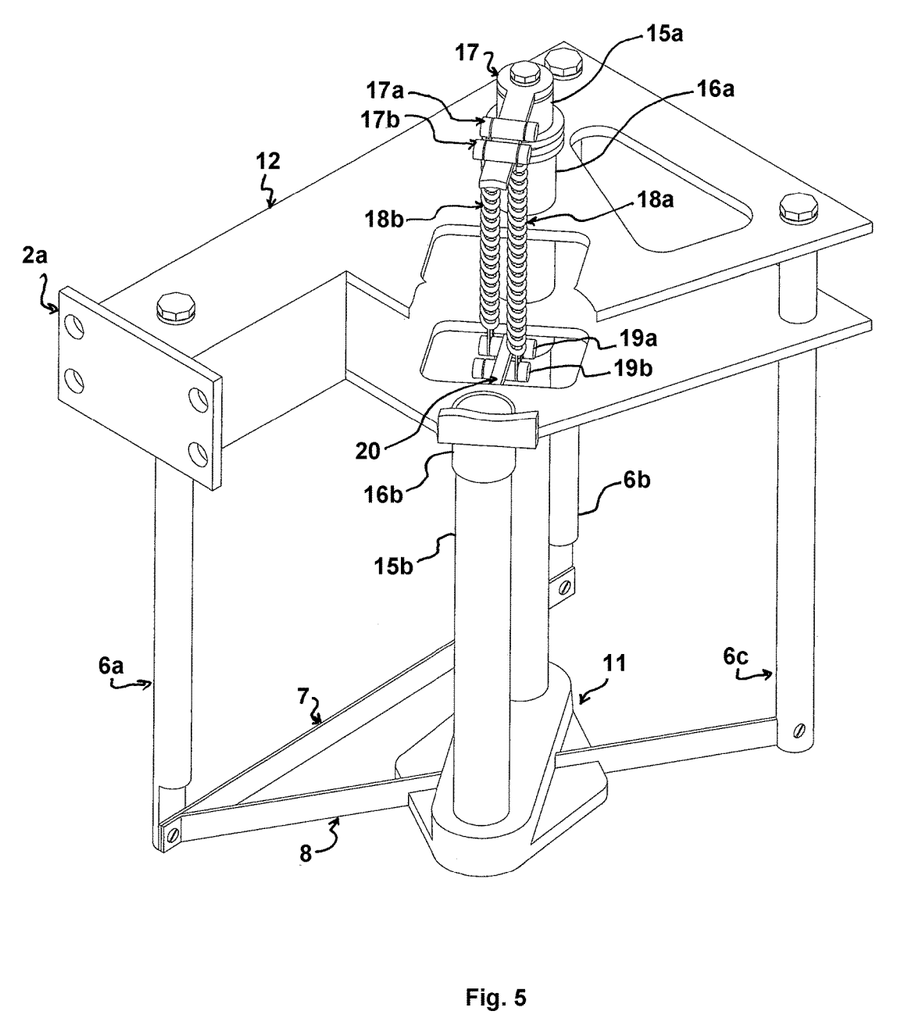
FIG. 5 shows cross-section 3'-3'-3'-3' of the knife carrier according to the invention shown in FIG. 3.

The cross-section 3'-3'-3'-3' of knife carrier 1 of FIG. 3 shown in FIG. 5 reveals platform tension spring mounting bridge 20 fixedly connected to mounting platform 12. Platform tension spring mounting bridge 20 includes one or more platform tension spring mount posts 19, shown here as a pair of platform tension spring mounting posts 19a, 19b, for mounting one or more tension springs 18, shown here as a pair of tension springs 18a, 18b. Tension springs 18, such as 18a, 18b, are preferably pre-tensioned between platform tension spring mount 19, such as 19a, 19b, respectively, and connecting bridge tension spring mounting posts 17, such as 17a, 17b, respectively.

Figure 6:
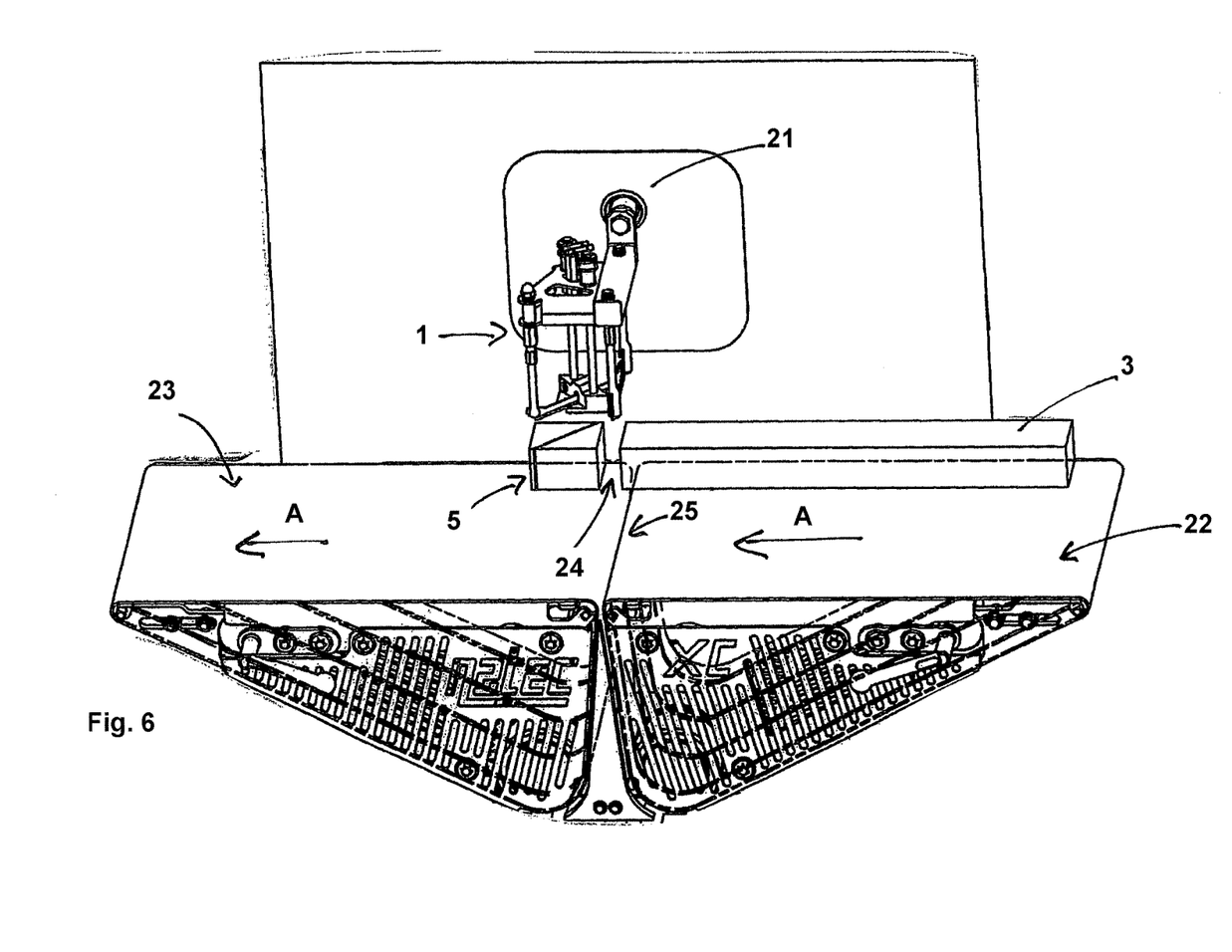
FIG. 6 shows a perspective view of a knife carrier according to the invention installed in a device.

FIG. 6 shows the complete device for transverse and diagonal cutting comprising the knife carrier 1, which is mounted on a drive device 21. In addition, a first conveyor belt 22 is depicted in FIG. 6, on which conveyor belt the strand 3 is fed to the knifes with a conveyance speed v1 in the conveyance direction (arrow A). The drive device 21 moves the knifes in a cutting motion, such as a "flying saw" motion. This cutting motion is guided with a conveyance speed parallel to the conveyance direction A and with a cutting speed perpendicular to the conveyance direction, so that a vertical cut is produced in the stack 5 despite the conveyance motion. The stack 5, which comprises two sub-stacks and is formed of slices of the food product, is separated from the strand by means of the cutting motion.

The device comprises a second conveyor belt 23, via which the cut stack 5 is carried away with a removal speed v2, which is greater than the conveyance speed v1, likewise in the conveyance direction A for further processing. The gap 24 which forms between the strand 3 and the stack is due to the different conveyance speeds and the cut at the belt transition 25.

LIST OF REFERENCE NUMBERS 1 knife carrier
2 support
2a support bracket
3 strand of food product
4 band of food product
5 stack of food product bands
6 cutting knife holder(s) 6a, 6b and 6c
7 transverse cutting knife
8 diagonal cutting knife
9 diagonal cut
10 sub-stack
11 hold-down device
11a slot adapted to receive diagonal cutting knife 8
12 mounting platform
13 individual slice
14 flattened edge
15 guide shaft(s) 15a, 15b
16 guide shaft cylinder(s) 16a, 16b
17 connecting bridge tension spring mounting post(s) 17a, 17b
18 tension spring(s) 18a, 18b
19 mounting platform tension spring mounting post(s) 19a, 19b
20 mounting platform tension spring mounting bridge
21 drive device
22 first conveyor belt
23 second conveyor belt
24 gap
25 belt transition
A conveyance direction

What is claimed is:

1. A method for transversely cutting a strand (3) of adhesively stacked bands (4) of a food product, which strand is moved with a conveyance speed in conveyance direction (A), which cutting is carried out by means of a transverse cutting knife which spans the width of the strand (3) and carries out a cutting motion for the transverse cutting, wherein the cutting motion is guided with a conveyance speed parallel to the conveyance direction (A) and with a cutting speed perpendicular to the conveyance direction and wherein, with the cutting motion, a stack (5) formed of slices (14) of the food product is separated from the strand (3),
  wherein a diagonal cutting knife is provided, which spans the width of the strand (3) and is disposed at an angle with respect to the transverse cutting knife, which diagonal cutting knife simultaneously carries out the cutting motion with the transverse cutting knife (7) to form a pair of substantially triangular prism shaped stacks (10) formed of substantially triangular slices.

2. The method according to claim 1, wherein the diagonal cutting knife diagonally cuts through the slices of the stack (5), but only cuts into or perforates the bottom slice.

3. The method according to claim 1, wherein the strand is fed by a first conveyor belt (16) with a conveyance speed and the cut stack (5) is carried away by a second conveyor belt (17) with a removal speed which is greater than the conveyance speed.

4. The method according to claim 1, wherein the two sub-stacks (10) are acted upon from above by a hold-down device (11) during the cutting motion and during the subsequent withdrawal of the diagonal cutting knife.

5. The method according to claim 1, wherein the angle between the diagonal cutting knife and the transverse cutting blade is between 40° and 50°.

6. The method according to claim 1, wherein the transverse cutting knife and the diagonal cutting knife are each mounted on a knife carrier at an oblique angle to each other to form a cutting device.

7. The method according to claim 6, wherein the knife carrier further comprises a hold down device (11) elastically mounted on the knife carrier over the diagonal cutting knife, wherein the hold down device (11) has a slot aligned with the diagonal cutting knife for receiving the diagonal cutting knife.

8. The method according to claim 6, wherein the transverse cutting knife 7 and the diagonal cutting knife 8 each have a cutting edge, wherein the cutting edge of the transverse cutting knife is substantially straight and the cutting edge of the diagonal cutting knife is straight, curved or serrated and located in, or offset and substantially parallel to, a plane passing through the cutting edge of the transverse cutting knife in a direction perpendicular to the cutting direction.

9. The method according to claim 6, wherein the cutting device is mounted on a drive device for driving the cutting motion in the form of an oscillating displacement of the cutting device between a raised position and a lowered position, wherein the cutting device is mounted on the drive device so that the cutting edge of the transverse cutting knife and the cutting edge of the diagonal cutting knife are oriented downward from the knife carrier.

10. The method according to claim 6, wherein the knife carrier comprises:
  a mounting platform (12) and
  a first, a second and a third cutting knife holder (6a, 6b, 6c), each cutting knife holder having a first end and a second end, wherein the first end of each cutting knife holder is fixedly connected to the mounting platform (12) and the second end of each cutting knife holder is adapted for attaching at least one cutting knife, wherein the second ends of the cutting knife holders are in spaced apart relation to each other in a single plane in spaced apart relation to the mounting platform (12).

11. The method according to claim 10, wherein the knife carrier further comprises a hold down device (11) elastically mounted between the second ends of two of the cutting knife holders, wherein the hold down device (11) has an engagement surface facing away from the mounting platform (12) having a slot in the engagement surface aligned with the two cutting knife holders.

12. The method according to claim 11, wherein the hold down device (11) is mounted on at least two guide shafts (15a, 15b) slidably mounted on the mounting platform (12), wherein each guide shaft has a first end and a second end, wherein the first end of each guide shaft is mounted on the hold down device (11) and the second end of each guide shaft is elastically connected to the mounting platform (12).

13. The method according to claim 10, wherein:
the transverse cutting knife has a first end, a second end and at least one cutting edge between the first end and the second end, and
the diagonal cutting knife has a first end, a second end and at least one cutting edge between the first end and the second end,
wherein
the first end of the transverse cutting knife and the first end of the diagonal cutting knife are mounted on the first cutting knife holder,
the second end of the transverse cutting knife is mounted on the second cutting knife holder and
the second end of the diagonal cutting knife is mounted on the third cutting knife holder,
whereby the transverse cutting knife and the diagonal cutting knife form an oblique angle relative to each other.

14. The method according to claim 13, wherein the diagonal cutting knife is disposed at an angle between 40° and 50° with respect to the transverse cutting knife.

15. The method according to claim 13, wherein the cutting edge of the transverse cutting knife is located substantially within a first plane and the cutting edge of the diagonal cutting knife lies on a second plane offset from, and parallel to, the plane through the cutting edge of the transverse cutting knife such that the plane through the cutting edge of the transverse cutting knife is further from the mounting platform than the cutting edge of the diagonal cutting knife.

16. The method according to claim 15, wherein the offset is in the range between 0.1 and 5 mm.

17. The method according to claim 13, wherein the cutting edge of the transverse cutting knife is located substantially within a plane and the cutting edge of the diagonal cutting knife is curved tangential to the plane in which the cutting edge of the transverse cutting knife is located.

18. The method according to claim 13, wherein the cutting device is mounted on a drive device for driving the cutting motion in the form of an oscillating displacement of the cutting device between a raised position and a lowered position, wherein the cutting device is mounted on the drive device so that the transverse cutting knife and the diagonal cutting knife are located below the mounting platform (12).

19. The method according to claim 1, wherein the substantially triangular prism shaped stacks (10) comprise two sides at substantially right angles to each other, wherein each individual slice in the stack is substantially triangular, has two edges perpendicular to each other corresponding to the two sides of the substantially triangular prism shaped stack at substantially right angles to each other and one edge which forms the hypotenuse of the right triangle, wherein
  (a) at least two stacks of food product, wherein the edges of individual slices forming the hypotenuse of one stack are disposed adjacent to the edges of the individual slices forming the hypotenuse of the other stack in one-to-one relation to one another and/or
  (b) the substantially triangular footprint of each stack is in the form of a quadrilateral having two sides corresponding to the two sides of the substantially triangular prism shaped stack at substantially right angles to each other, wherein at least 80 percent of the surface area of the quadrilateral is triangular.

* * * * *

UNITED STATES PATENT AND TRADEMARK OFFICE
CERTIFICATE OF CORRECTION

PATENT NO. : 10,434,673 B2
APPLICATION NO. : 14/982845
DATED : October 8, 2019
INVENTOR(S) : Mueller et al.

Page 1 of 1

It is certified that error appears in the above-identified patent and that said Letters Patent is hereby corrected as shown below:

On the Title Page

Item (54), Line 1, After "OF", insert --A--

In the Specification

Column 1, Title Line 1, After "OF", insert --A--
Column 2, Summary of the Invention, Line 23, Delete "(15)" and insert --(21)-- therefor
Column 2, Summary of the Invention, Line 56, Delete "(14)" and insert --(13)-- therefor Signed and Sealed this
Twenty-fifth Day of August, 2020

Andrei Iancu
*Director of the United States Patent and Trademark Office*